June 6, 1939.　　　　G. A. HOOD　　　　2,161,296

OPHTHALMIC MOUNTING

Filed Sept. 16, 1938

INVENTOR.
George A. Hood,
BY George D. Richards
ATTORNEY.

Patented June 6, 1939

2,161,296

UNITED STATES PATENT OFFICE 2,161,296

OPHTHALMIC MOUNTING

George A. Hood, Newark, N. J., assignor to New Jersey Optical Company, Irvington, N. J., a corporation of New Jersey Application September 16, 1938, Serial No. 230,166

2 Claims. (Cl. 88—41)

This invention relates to improvements in ophthalmic mountings of the rimless spectacle frame type.

This invention has for an object to provide a novel construction of flexible rimless spectacle frame provided with spring bridge means operative to cause the nose-guard elements of the frame to tensionally grip the nose of the wearer.

Another object of the invention is to provide a novel flexible rimless spectacle frame having substantially concealed supporting extensions or bars to carry both the spring bridge means and the temple connections of the frame.

The invention has for a further object to provide, in a flexible rimless spectacle frame as above characterized, means to provide an embracing engagement of the supported bridge means ends with marginal portions of the lenses carried by the frame, whereby the lenses, although embraced by and aligned with the bridge means, are not subjected to transmitted stresses or strains when the bridge means is flexed or held under flexional tension.

Other objects of this invention, not at this time more particularly enumerated, will be understood from the following detailed description of the same.

Figure 1:
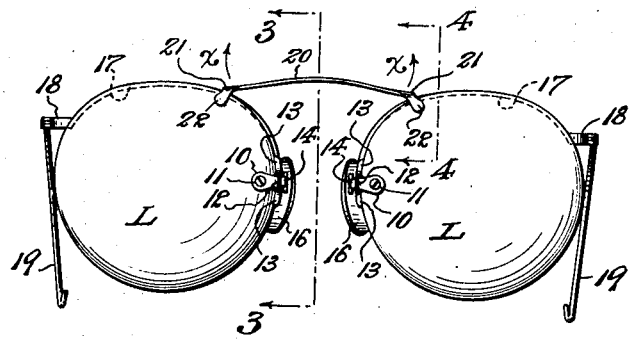
Figure 2:
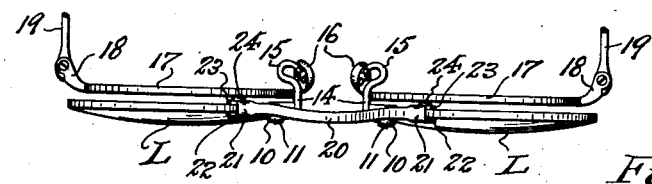
Figure 3:
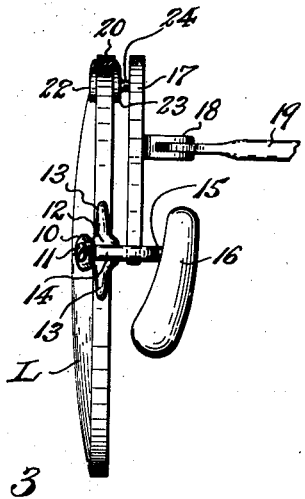
Figure 4:
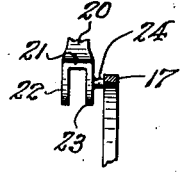

An illustrative embodiment of this invention is shown in the accompanying drawing, in which:

Fig. 1 is a front face view of a pair of spectacles provided with the novel flexible rimless frame made according to this invention; Fig. 2 is a top edge view of the same, portions of the temple bows being broken away; Fig. 3 is a transverse vertical section, taken on line 3—3 in Fig. 1, but drawn on a greatly enlarged scale; and Fig. 4 is a fragmentary transverse vertical section, taken on line 4—4 in Fig. 1, and also drawn on an enlarged scale, but with the lens removed.

Similar characters of reference are employed in the hereinabove described views, to indicate corresponding parts.

Referring to the drawing, the novel rimless spectacle frame comprises strap structures 10 which straddle the nasal marginal portions of the lenses L, being secured in supporting relation to the latter by the fastening screws 11, or in any other suitable or well-known manner. The butt portions 12 of said strap structures engage transversely across the edges of the lenses L to which they are attached, and extending in opposite directions, respectively from the upper and undersides of said butt portions 12 are arcuate strap portions 13 adapted to engage the adjacent lens edges to brace and hold the lenses in position.

Suitably secured to the external faces of the respective strap structure butt portions 12, in any suitable manner, as, e. g., by solder, are transversely and rearwardly extending offsetting arms 14. Suitably connected with the free ends of said offsetting arms 14, preferably as integral extensions thereof, are the carrier bracket members 15 by which the pads 16 of suitable nose-guard structures are supported.

Suitably secured by their inner end portions to the respective offsetting arms 14 are supporting extensions or bars 17. These extensions or bars are spaced behind the lenses L, and are shaped to conform substantially to the upper peripheral shape of the latter, so as to extend along and behind the upper marginal portions of said lenses and substantially parallel thereto. At their outer extremities, said extensions or bars 17 terminate in laterally and rearwardly offset temple hinging end pieces 18, to which the temple bows 19 are pivotally connected in such manner as to fold inwardly across the rear of the lenses L, when the spectacle frame is not in use.

Extending between the inner top portions of the lenses L is a bridge means, the same comprising a suitably shaped and bowed body 20 of spring metal, preferably made of flat strip stock. At its respective ends, said bridge body 20 is provided with stirrup pieces or channeled members 21 adapted to straddle and loosely engage the top marginal portions of the lenses L, the same having side pieces 22 and 23 to respectively overlap the front and rear faces of said lenses. The bridge body ends are rigidly anchored to the respective extensions or bars 17 by intermediate coupling means or anchor portions 24. Said coupling means or anchor portions 24, in a preferred arrangement thereof, are affixed to the external faces of the inner side pieces 23 of the stirrup pieces or channeled members 21 to extend laterally rearward therefrom to affixed connection with the opposed side of the adjacent extension or bar 17.

From the above description of the novel flexible rimless spectacle frame structure it will be obvious that by flexing the bridge body end portions in the directions of the arrows $x$ (see Fig. 1), the resultant movements will be transmitted through the anchor portions 24 to the extensions or bars 17 in such manner that the latter will accompany the movement of the bridge end portions and through the rigid interconnection of the inner ends thereof with and between the lens supporting strap structures and the nose-guard structures will cause the latter to spread apart for application to and over the nose of the wearer, so that when the flexing pressure upon the bridge body is removed the stored flexional tension will yieldably urge the nose-guard structures toward one another so as to grippingly engage the wearer's nose. Owing to the fact that the stirrup pieces or channeled members 21 of the bridge body 20 merely loosely embrace the marginal portions of the lenses L (since they have no fixed connection therewith or fastened coupled relation thereto), said stirrup pieces or channeled members are free for slight play or movement relative to the lens marginal portions without, however, releasing of the embrace thereof whereby the lenses and bridge means are retained in alignment. As a consequence of this allowance for slight relative play between the bridge end portions and the lenses, the latter are not subjected to any transmitted stresses or strains due to flexing movements of the bridge body or to flexional tension stored in the latter. All such stresses and strains are carried by the extensions or bars 17, and are transmited therethrough only to the strap structures through the connections of the inner ends of said extensions or bars with the latter, so that such stresses and strains are absorbed by the extensions or bars 17 and the strap structures, thus eliminating risk of breakage or other harmful effects upon the lenses.

From the above it will be understood that this invention provides a novel flexible rimless spectacle frame in which the temple and bridge supporting means is strong and sturdy, and so arranged as to allow for adequate flexible play of the bridge and transmission of the stored tension of the latter by the nose-guard structure without submitting the lenses to stress or strain, while at the same time said temple and bridge supporting means is substantially concealed so as to retain the rimless aspect of the mounting.

I am aware that various changes and many apparently widely different embodiments of this invention could be made without departing from the scope thereof as defined in the following claims. It is therefore intended that all matter contained in the above description or shown in the accompanying drawing shall be interpreted as illustrative and not in a limiting sense.

I claim:

1. A rimless spectacle frame comprising a pair of lenses, strap structures secured to the nasal edge portions of said lenses to support said lenses, offsetting arms affixed and projecting rearwardly from said strap structures, nose-guard structures carried by the free ends of said offsetting arms, supporting bars having their inner ends affixed to said offsetting arms intermediate said strap and nose-guard structures, said supporting bars being disposed to extend behind and substantially along the upper peripheral portions of said lenses in spaced substantially parallel relation thereto, temple hinging end pieces carried at the outer ends of said supporting bars, a flexible spring bridge extending between the inner top edge portions of said lenses, said bridge having bifurcate end portions slidably embracing the lens top edge portions, and anchor portions fixedly interconnecting said bridge end portions with said supporting bars at points intermediate the ends of the latter.

2. A rimless spectacle frame comprising a pair of lenses, strap structures secured to the nasal edge portions of said lenses to support said lenses, offsetting arms affixed and projecting rearwardly from said strap structures, nose-guard structures carried by the free ends of said offsetting arms, supporting bars having their inner ends affixed to said offsetting arms intermediate said strap and noseguard structures, said supporting bars being disposed to extend behind and substantially along the upper peripheral portions of said lenses in spaced substantially parallel relation thereto, temple hinging end pieces carried at the outer ends of said supporting bars, a spring bridge extending between the inner top edge portions of said lenses, said bridge having channeled members at its ends the side pieces of which respectively overlap the front and rear faces of the lens edge portions thereby loosely embracing the latter, and anchor portions rigidly affixed to and between the rear side pieces and the adjacent supporting bars.

GEO. A. HOOD.